(12) United States Patent
Eck et al.

(10) Patent No.: US 6,730,722 B1
(45) Date of Patent: May 4, 2004

(54) CROSS-LINKABLE POLYMER POWDER COMPOSITIONS

(75) Inventors: Herbert Eck, Bad Tölz (DE); Hans Donislreiter, Marktl (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/719,693

(22) PCT Filed: Jun. 2, 1999

(86) PCT No.: PCT/EP99/03826

§ 371 (c)(1),
(2), (4) Date: Feb. 2, 2001

(87) PCT Pub. No.: WO99/67325

PCT Pub. Date: Dec. 29, 1999

(30) Foreign Application Priority Data

Jun. 19, 1998 (DE) .......................................... 198 27 425

(51) Int. Cl.$^7$ ................................................ C08K 3/10
(52) U.S. Cl. ..................... 524/3; 427/385.5; 427/389.9; 427/391; 427/393; 524/4; 524/5; 524/7; 524/494; 525/54.21; 525/54.23; 525/54.24; 525/54.26; 525/57; 525/61; 525/193; 525/194; 525/195; 525/337

(58) Field of Search ................................ 524/183, 184, 524/185, 3, 4, 5, 7, 494; 525/193, 194, 195, 337, 54.21, 54.23, 54.24, 54.26, 57, 61; 427/385.5, 389.9, 391, 393

(56) References Cited

U.S. PATENT DOCUMENTS

| | | | | |
|---|---|---|---|---|
| 2,326,539 A | * | 8/1943 | Irany | 525/56 |
| 2,362,761 A | * | 11/1944 | Medl, Jr. | 106/176.1 |
| 2,453,108 A | * | 11/1948 | Curtis | 536/55 |
| 3,144,412 A | * | 8/1964 | Inamorato | 252/138 |
| 3,329,523 A | * | 7/1967 | Best et al. | 427/345 |
| 3,329,525 A | * | 7/1967 | Powers | 428/511 |
| 3,409,578 A | | 11/1968 | Hwa et al. | |
| 3,425,968 A | * | 2/1969 | Reiling | 524/21 |
| 3,494,782 A | * | 2/1970 | Clark et al. | 428/323 |
| 3,565,818 A | * | 2/1971 | Bayless et al. | 428/402.22 |
| 3,582,390 A | | 6/1971 | Saulnier | 427/69 |
| 3,639,234 A | * | 2/1972 | Wixon et al. | 252/8.6 |
| 3,646,098 A | * | 2/1972 | Cyba | 558/291 |
| 3,703,772 A | * | 11/1972 | McHugh et al. | 34/9 |
| 3,755,181 A | * | 8/1973 | Henricks | 510/465 |
| 3,781,228 A | * | 12/1973 | McDonnell et al. | 252/539 |
| 3,929,679 A | * | 12/1975 | Cala | 252/527 |
| 4,626,372 A | * | 12/1986 | Kaufmann et al. | 510/296 |
| 4,828,721 A | * | 5/1989 | Bollier et al. | 252/8.7 |
| 4,980,086 A | * | 12/1990 | Hiraiwa et al. | 252/511 |
| 5,668,216 A | | 9/1997 | Kinkel et al. | |
| 6,083,653 A | * | 7/2000 | Baur et al. | 430/108.3 |
| 6,288,009 B1 | * | 9/2001 | Kober et al. | 504/118 |

FOREIGN PATENT DOCUMENTS

| | | |
|---|---|---|
| EP | 0 088 552 | 9/1983 |
| EP | 0 721 004 | 7/1996 |
| EP | 0 687 317 | 11/1996 |
| WO | 96/01853 | 1/1996 |
| WO | 99/16794 | 4/1999 |

OTHER PUBLICATIONS

English Abstract corresponding to WO 99/16794.
Gmelin, Borverbindungen (boron compounds) 8, pp. 119, 129, 133, 135.
Fox T.G., Bull. Am. Physics Soc. 1 (1956) 3, p. 123.
The Polymer Handbook, 3$^{rd}$ Edition, J. Wiley & Sons, New York (1989).

* cited by examiner

*Primary Examiner*—Judy M. Reddick
(74) *Attorney, Agent, or Firm*—Brooks Kushman P.C.

(57) ABSTRACT

The invention provides cross-linkable polymer powder compositions containing a) at least one water-soluble polyhydroxy compound; b) at least one boric acid complex compound which is of limited solubility in water that is, it has a water solubility of less than 10 g per liter at normal conditions; and optionally c) a water-soluble film-forming polymer consisting of one or more free-radical polymerizable, ethylenically unsaturated monomers. The compositions are useful as a constituent in adhesives, plaster, jointing mortars, paints and binders for coating compositions, textiles, paper and the like.

23 Claims, 1 Drawing Sheet

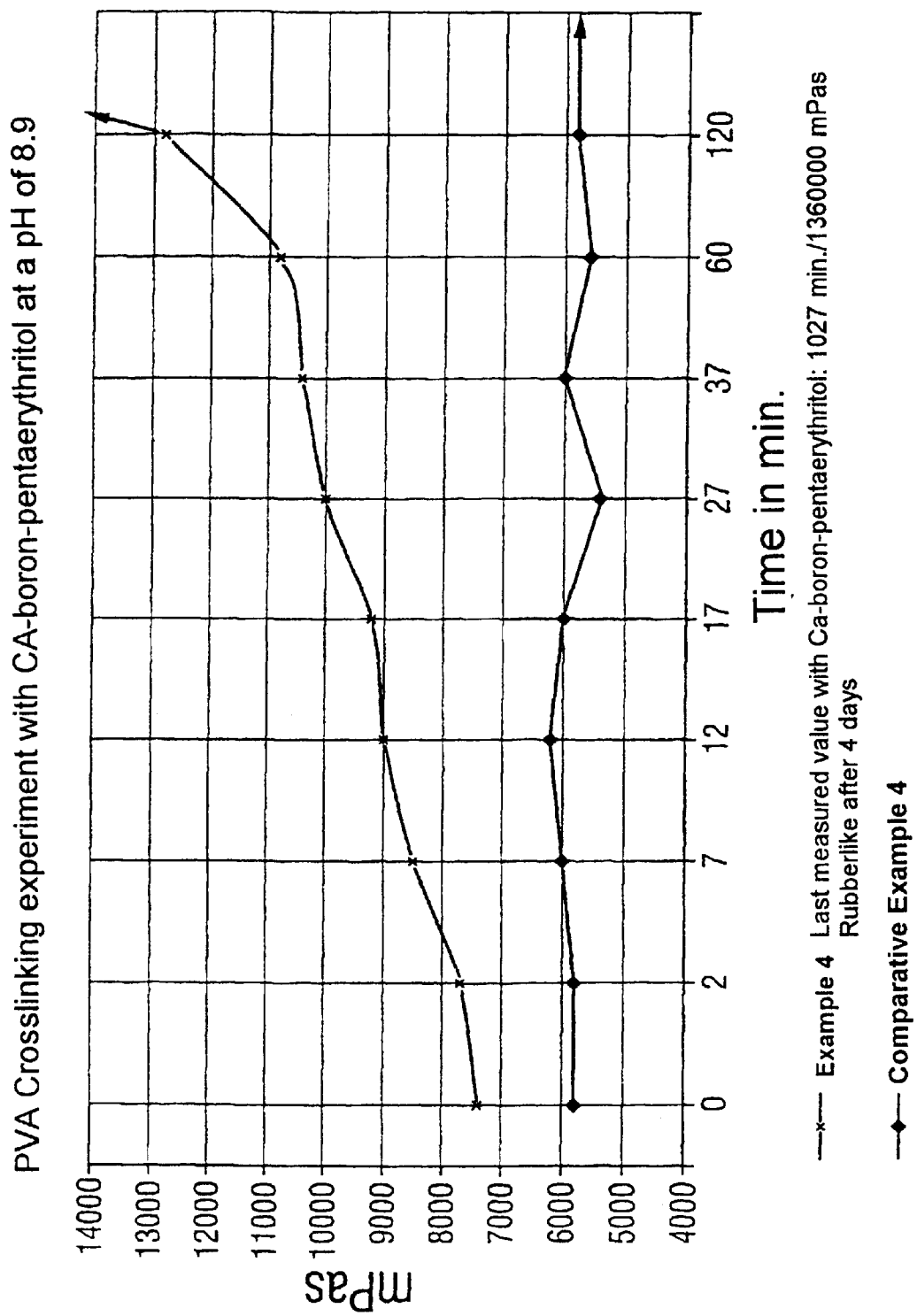

1

CROSS-LINKABLE POLYMER POWDER COMPOSITIONS

BACKGROUND OF THE INVENTION

The invention relates to crosslinkable polymer powder compositions, to processes for preparing them, and to the use thereof.

BACKGROUND ART

Crosslinkable dispersion powders are known from U.S. Pat. No. 3,409,578 in which powder compositions comprising carboxyl-containing polymers and/or carboxyl-containing protective colloids are crosslinked in the presence of polyvalent metal ions. A disadvantage is that such compositions containing polyvalent metal salts frequently tend to release acid in the presence of water and to undergo premature crosslinking, especially on contact with moisture. EP-B 687317 describes water redispersible, crosslinkable powders based on N-methylol-functional copolymers which crosslink thermally. A disadvantage of the latter powder is the fact that powders which can be crosslinked by means of heat alone are unsuitable for use in many applications.

EP-A 721004 discloses crosslinkable, redispersible powder mixtures comprising film-forming polymer particles containing at least one functional, crosslinkable group. The crosslinkable group may also be introduced by way of the protective colloids. For crosslinking, this document recommends the addition of an external crosslinker comprising at least one reactive component which enters into nonionic bonds with the functional groups when the mixture is redispersed in water. Boron compounds are cited as an example.

It is known that boric acid and borax cause thickening and gelling of polyhydroxy compounds such as polyvinyl alcohol, cellulose, and dextran, and may therefore gel to form inclusion compounds with herbicides, for example, in the strongly alkaline range (EP-A 88552).

Since the crosslinking reaction proceeds spontaneously and, in contrast to salt coagulation, is irreversible by heating, the practical possibilities for application are very restricted. For example, a redispersible powder stabilized with polyvinyl alcohol cannot be redispersed in the presence of boric acid or borax, in an amount sufficient to gel the polyvinyl alcohol, in an aqueous medium whose pH is more than 8.

SUMMARY OF THE INVENTION

An object of the invention is therefore to provide crosslinkable polymer powder compositions which crosslink, while ensuring an appropriate processing time, even in an alkaline aqueous medium and even at room temperature.

BRIEF DESCRIPTION OF THE DRAWINGS

FIG. 1 illustrates the viscosity change with respect to time of the compositions of Example 4 and Comparative Example 4.

DETAILED DESCRIPTION OF THE PREFERRED EMBODIMENTS

The invention provides crosslinkable polymer powder compositions comprising
a) at least one water soluble polyhydroxy compound,
b) at least one boric acid complex compound of low solubility in water, having a water solubility of less than 10 g per liter under standard conditions, and, if desired,
c) a water insoluble, film-forming polymer of one or more free-radically polymerizable, ethylenically unsaturated monomers.

Compounds suitable as component b) are salts of boric acid complexes with bidentate and polydentate ligands whose water solubility under standard conditions (23° C., DIN 50014) is less than 10 g per liter, preferably less than 6 g per liter, with particular preference less than 2 g per liter.

Suitable ligands for the boric acid complexes are aliphatic and alicyclic and also aromatic polyols having preferably 2 to 12 carbon atoms and having 2 or more, preferably from 2 to 8, OH groups. Examples of diols are ethylene glycol, 1,2-propanediol, 1,3-propanediol, 1,2-butanediol, 1,3-butanediol, 2,4-pentanediol, cis-1,2-cyclopentanediol, cis-1, 2-cyclohexanediol, pyrocatechol, 4-methyl-1,2-dihydroxybenzene, 4-t-butyl-1,2-dihydroxybenzene, 1,2-dihydroxynaphthalene, 2,3-dihydroxynaphthalene, 1,8-dihydroxynaphthalene, and 2-hydroxymethylphenol.

Tridentate ligands which may be mentioned by way of example are the following: glycerol, 2-hydroxymethyl-2-methyl-1,3-propanediol, 2-hydroxymethyl-2-ethyl-1,3-propanediol, tris(hydroxymethyl)isobutane, tris (hydroxymethyl)pentane, and pentaerythritol.

Examples of tetradentate and higher polydentate ligands are sugars such as mannose, fructose, glucose, galactose, and arabinose; hydrogenated sugars such as mannitol, xylitol or glucitol; and sugar acids such as gluconic acid, mannonic acid, glucosaccharic acid or talonic acid.

Suitable cations of the borate complexes are monovalent to trivalent metals, and also ammonium compounds. Preference is given to monovalent and divalent metals from the main groups and transition groups of the Periodic Table, especially of main groups 1 and 2 and of transition groups 1, 2, 7 and 8. $Li^+$, $Na^+$, $K^+$, $Mg^{2+}$, $Ca^{2+}$, $Fe^{2+}$, $Co^{2+}$, $Ni^{2+}$, $Mn^{2+}$ and $Zn^{2+}$ are particularly preferred.

Preferred boric acid complexes are those with pentaerythritol, tartaric acid, trihydroxyglutaric acid or mucic acid ligands and a cation from the group just mentioned as particularly preferred. Greatest preference is given to the following complexes:

Pentaerythritol Complex Salts (Gmelin, Borverbindungen [Boron Compounds] 8, 119):

$Ca(C_5H_8O_4)_2 \cdot B_2O_3 \cdot 9H_2O$, solubility ($H_2O$, 25° C.): 1.0 g/l $Zn(C_5H_8O_4)_2 \cdot B_2O_3 \cdot 10H_2O$, solubility ($H_2O$, 25° C.): 0.04 g/l Tartaric Acid Complexes (Gmelin, Borverbindungen 8, 129):

$K_2O \cdot 2SrO \cdot B_2O_3 \cdot 2C_4H_4O_5 \cdot 10H_2O$, solubility ($H_2O$, 25° C.): 1.7 g/l $3ZnO \cdot B_2O_3 \cdot 2C_4H_4O_5 \cdot 3H_2O$, solubility ($H_2O$, 25° C.): 3.7 g/l $5CaO \cdot B_2O_3 \cdot 4C_4H_4O_5 \cdot 16H_2O$, solubility ($H_2O$, 25° C.): 2.46 g/l $3CaO \cdot 2(NH_4)_2O \cdot B_2O_3 \cdot 4C_4H_4O_5 \cdot 10H_2O$, solubility ($H_2O$, 25° C.): 1.77 g/l Trihydroxyglutaric Acid Complexes (Gmelin, Borverbindungen 8, 133):

$2CaO \cdot B_2O_3 \cdot C_5H_6O_6 \cdot 9H_2O$, solubility ($H_2O$, 25° C.): 0.5 g/l $4CaO \cdot B_2O_3 \cdot C_5H_6O_6 \cdot 13H_2O$, solubility ($H_2O$, 25° C.): 0.055 g/l $4CaO \cdot (NH_4)_2O \cdot B_2O_3 \cdot 3C_5H_6O_6 \cdot 12H_2O$, solubility ($H_2O$, 25° C.): 0.291 g/l Mucic Acid Complexes (Gmelin, Borverbindungen 8, 135):

$2.5MgO \cdot 0.5(NH_4)_2O \cdot B_2O_3 \cdot 2C_6H_8O_7 \cdot 8H_2O$, solubility ($H_2O$, 25° C.): 1.45 g/l $3CaO \cdot B_2O_3 \cdot 2C_6H_8O_7 \cdot 10H_2O$, solubility ($H_2O$, 25° C.): 2.2 g/l The usual amount of boric acid complexes is from 0.2 to 40% by weight, based on component a), and depends not only on the desired rheology effect or degree of crosslinking but also on the molecular weight of the polyhydroxy compound. Preferred amounts for use are from 1 to 20% by weight, based on component a).

Suitable water soluble polyhydroxy compounds a) are partially hydrolyzed polyvinyl alcohols, water soluble polysaccharides such as starches (amylose), dextrins, cyclodextrins, dextran, xylan and celluloses and also derivatives thereof such as carboxymethyl-, methyl-, hydroxyethyl- and hydroxypropyl-celluloses. Water soluble in this context means that the solubility in water under standard conditions is more than 10 g per liter. Preference is given to using one or more partially hydrolyzed polyvinyl alcohols having a degree of hydrolysis of from 75 to 99 mol % and a Höppler viscosity (4% strength aqueous solution, DIN 53015, Höppler method at 20° C.) of from 1 to 60 mPas, in particular from 4 to 35 mPas.

For the preferred case where the polymer powder composition also comprises a water insoluble, film-forming polymer c), the fraction of polyhydroxy compound b) is from 1 to 30% by weight, based on the water insoluble polymer fraction c). Particular preference is given to from 8 to 30% by weight.

Suitable water insoluble, film-forming polymers contain one or more monomer units from the group of the vinyl esters of unbranched or branched alkylcarboxylic acids having 1 to 15 carbon atoms, the methacrylic esters and acrylic esters or unbranched or branched alcohols having 1 to 12 carbon atoms, the dienes, the olefins, the vinylaromatics, and the vinyl halides. Water insoluble in this context means that the solubility of the polymers under standard conditions (23° C., 50% atmospheric humidity, DIN 50014) is less than 1 g per liter of water.

Preferred vinyl esters are vinyl acetate, vinyl propionate, vinyl butyrate, vinyl-2-ethylhexanoate, vinyl laurate, 1-methylvinyl acetate, vinyl pivalate, and vinyl esters of alpha-branched monocarboxylic acids having 9 to 11 carbon atoms, for example, VeoVa9$^R$ or VeoVa10$^R$ (trade names of Shell). Vinyl acetate is particularly preferred.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Methyl acrylate, methyl methacrylate, n-butyl acrylate and 2-ethylhexyl acrylate are particularly preferred.

Preferred vinylaromatics are styrene, methylstyrene, and vinyltoluene. A preferred vinyl halide is vinyl chloride. The preferred olefins are ethylene and propylene, and the preferred dienes are 1,3-butadiene and isoprene.

If desired, from 0.05 to 10.0% by weight, based on the overall weight of the monomers, of auxiliary monomers from the group comprising ethylenically unsaturated mono- and dicarboxylic acids and their amides, such as acrylic acid, methacrylic acid, maleic acid, fumaric acid, itaconic acid, acrylamide, and methacrylamide; ethylenically unsaturated sulfonic acids and their salts, preferably vinylsulfonic acid, 2-acrylamido-propanesulfonate, and N-vinylpyrrolidone, may be copolymerized. Further examples of auxiliary monomers in the stated quantities are alkoxysilane-functional monomers such as acryloyloxypropyltri(alkoxy)- and methacryloyloxypropyltri(alkoxy)-silanes, vinyltrialkoxysilanes and vinylmethyldialkoxysilanes, preferably vinyltriethoxysilane and gamma-methacryloyloxypropyltriethoxysilane. Also suitable are cross-linkers such as acrylamidoglycolic acid (AGA), methacrylamidoglycolic acid methyl ester (MAGME), N-methylolacrylamide (NMA), N-methylolmethacrylamide (NMMA), N-methylol allylcarbamate, alkyl ethers of N-methylolacrylamide or N-methylolmethacrylamide, and also the isobutoxy ethers or n-butoxy ethers thereof.

Further examples of crosslinkable auxiliary monomers are comonomers containing epoxide groups, such as glycidyl acrylate, glycidyl methacrylate, glycidyl vinyl ether, and glycidyl allyl ether and isocyanate monomers such as meta- and para-isopropenyl-alpha,alpha-dimethyl-benzyl isocyanate (TMI), 2-methyl-2-isocyanatopropyl methacrylate, where the isocyanate groups of said monomers may, if desired, also have been blocked, and also polyethylenically unsaturated compounds such as ethylene glycol diacrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate.

Preferred polymers c) are those set out below, the amounts in percent by weight, together if appropriate with the auxiliary monomer fraction, adding up to 100% by weight:

From the group of the vinyl ester polymers
  vinyl acetate polymers;
  vinyl acetate-ethylene copolymers having an ethylene content of from 1 to 60% by weight;
  vinyl ester-ethylene vinyl chloride copolymers having an ethylene content of from 1 to 40% by weight and a vinyl chloride content of from 20 to 90% by weight, vinyl esters present preferably comprising vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid, especially Versatic acid vinyl esters (VeoVa9$^R$, VeoVa10$^R$, VeoVa11$^R$);
  vinyl acetate copolymers containing 1 to 50% by weight of one or more copolymerizable vinyl esters such as vinyl laurate, vinyl pivalate, vinyl 2-ethylhexanoate, vinyl esters of an alpha-branched carboxylic acid, especially versatic acid vinyl esters (VeoVa9$^R$, VeoVa10$^R$, VeoVa11$^R$), also containing 1 to 40% by weight of ethylene if desired;
  vinyl ester-acrylic ester copolymers containing 30 to 90% by weight of vinyl ester, especially vinyl acetate, and 1 to 60% by weight of acrylic ester, especially n-butyl acrylate or 2-ethylhexyl acrylate, also containing from 1 to 40% by weight of ethylene if desired;
  vinyl ester-acrylic ester copolymers containing 30 to 75% by weight of vinyl acetate, 1 to 30% by weight of vinyl laurate or vinyl esters of an alpha-branched carboxylic acid, especially versatic acid vinyl esters, 1 to 30% by weight of acrylic esters, especially n-butylacrylate or 2-ethylhexylacrylate, which also contain from 1 to 40% by weight of ethylene if desired.

From the group of the (meth)acrylic acid polymers
  polymers of n-butyl acrylate or 2-ethylhexyl acrylate;
  copolymers of methyl methacrylate with n-butyl acrylate and/or 2-ethylhexyl acrylate.

From the group of the vinyl chloride polymers, in addition to the abovementioned, vinyl ester-vinyl chloride-ethylene copolymers
  vinyl chloride-ethylene copolymers and vinyl chloride-acrylate copolymers.

From the group of the styrene polymers
styrene-butadiene copolymers and
styrene-acrylic ester copolymers such as styrene-n-butylacrylate or styrene-2-ethylhexyl acrylate with a styrene content of in each case 10 to 70% by weight.

For film formation, the polymer composition is generally chosen so that film formation takes place at the processing temperature, preferably so as to result in a glass transition temperature Tg of from −30° C. to +80° C. The glass transition temperature Tg of the polymers may be determined in a known manner by means of differential scanning calorimetry (DSC). The Tg may also be calculated approximately in advance using the Fox equation. According to Fox T. G., Bull. Am. Physics Soc. 1 (1956) 3, page 123: $1/Tg=x_1/Tg_1+x_2/Tg_2+ \ldots +x_n/Tg_n$, where $x_n$ represents the mass fraction (% by weight/100) of the monomer n and $Tg_n$ is the glass transition temperature, in degrees Kelvin, of the homopolymer of the monomer n. Tg values for homopolymers are listed in Polymer Handbook 3rd Edition, J. Wiley & Sons, New York (1989).

The polymers c) are prepared in a known manner by the emulsion polymerization process with subsequent drying of the aqueous polymer dispersions thus obtainable, preferably by means of spray drying, for example, in accordance with the procedure described in DE-A 19742679, whose disclosure content in this respect is intended to be part of the present specification.

The polyhydroxy compound a) may be added during the polymerization of the water insoluble polymer fraction or else may be added subsequently, before or during the drying, to the polymer dispersion. The boric acid complexes b) are added during or after the drying operation, together if appropriate with other additives such as antiblocking agents, crosslinkers, dyes, pigments, plasticizers, filming auxiliaries, antifoams, catalysts, rheological assistants, thickeners, tackifiers, emulsifiers, and hydrophobicizers. The individual constituents a), b) and c) of the polymer powder composition can be added in a mixture or else separately to the respective formulation at the time of application; an example of a possible procedure is that wherein, at the time of application, a water redispersible powder based on a polymer c) and a polyhydroxy compound a) is added to the respective formulation separately or in a mixture with the boric acid complex compound b).

The crosslinkable polymer powder composition may be used in the fields of application typical for such compositions: for example, in chemical products for the construction industry, in conjunction with inorganic, hydraulically setting binders such as cements (Portland, aluminate, pozzolanic, slag, magnesia, and phosphate cement), gypsum, water glass, for the production of structural adhesives, plasters and renders, filling compounds, trowel applied flooring compounds, jointing mortars, and paints, and also as sole binders for coating compositions and adhesives or as binders for textiles and paper.

The examples below serve to illustrate the invention.
Preparation of the crosslinkable polymer powder composition:

EXAMPLE 1

1 mol of pentaerythritol was dissolved in hot water and 1 mol of boric acid was added to the solution. The solution was cooled, and 8 mol of $NH_3$ in the form of a concentrated aqueous solution were added. Subsequently, ½ mol of $CaCl_2$, likewise in the form of a concentrated aqueous solution, was stirred in. The white precipitate was filtered off with suction and dried under reduced pressure at 100° C. 0.75 part by weight of the complex salt obtained was mixed with 25 parts by weight of a water redispersible powder mixture comprising a vinyl acetate-ethylene copolymer having an ethylene content of 22% with 5.6% by weight, based on copolymer, of a polyvinyl alcohol having a degree of hydrolysis of 86 mol % and a Höppler viscosity of 13 mPas.

EXAMPLE 2

The procedure of example 1 was repeated but adding ½ mol of zinc acetate instead of ½ mol of $CaCl_2$. After drying, the complex salt contained 2 mol of water.

0.75 part by weight of the resulting complex salt was mixed with 25 parts by weight of the water redispersible powder mixture described in example 1.

EXAMPLE 3

The procedure of example 1 was repeated with the difference that the complex was precipitated by adding a hot concentrated LiOH solution to a hot solution of pentaerythritol and boric acid in a molar ratio of 1:2 at a pH of 11 by dropwise addition of ethanol. After drying, the complex contained 5 mol of water of crystallization.

0.75 part by weight of the resulting complex salt was mixed with 25 parts by weight of the water redispersible powder mixture described in example 1.

Performance Testing:

The polymer compositions obtained in examples 1 to 3 were tested for their processing properties in a cement plaster formulation.

For this purpose, 25 parts by weight of cement (CEM I) were intimately mixed with 25.75 parts by weight of each of the polymer compositions obtained in examples 1 to 3 and the mixtures were subsequently stirred for 5 minutes with 50 parts by weight of water.

As a comparative example, a cement mixture to which free boric acid rather than a boric acid complex was added (comparative example 1), and a cement mixture stirred without any crosslinking additive at all (comparative example 2), were prepared by stirring.

The viscosity of the mixtures was assessed in each case during stirring and 10 minutes and 1 hour after stirring. The results are summarized in table 1:

TABLE 1

| | Viscosity | | |
| --- | --- | --- | --- |
| Example | On stirring | After 10 minutes | After 1 hour |
| Example 1 | highly viscous | viscous mass | not brushable |
| Example 2 | readily brushable | readily brushable | readily brushable |
| Example 3 | stiff mass | brushable with difficulty | unbrushable |
| Comp. ex. 1 | not miscible | — | — |
| Comp. ex. 2 | readily brushable | readily brushable | readily brushable |

The reference used was comparative example 2, which was operated without the addition of crosslinker and in which the mass remained processable over a long period of time. When boric acid is used as component b), there is immediate crosslinking of the polyvinyl alcohol fraction and the constituents of the formulation can no longer be mixed homogeneously. When boric acid complexes are used, in accordance with the invention, the cement masses can be stirred up and remain processable, at least for the first few minutes, before crosslinking sets in. In example 2, the batch remains processable for 8 hours, at which point the viscosity is much higher than in comparative example 2.

EXAMPLE 4

0.5 g of the complex described in example 1 was mixed into 99.5 g of a water redispersible powder mixture comprising 85.4% by weight of vinyl acetate-ethylene-VeoVa10 copolymer (63% vinyl acetate, 27% ethylene and 10% VeoVa10) and 8.8% by weight of a polyvinyl alcohol (4 mPas, 86 mol % degree of hydrolysis), 2.5% by weight of a polyvinyl alcohol (25 mPas, 86 mol % degree of hydrolysis) and 3.3% by weight of a polyvinyl alcohol (13 mPas, 86 mol % degree of hydrolysis). The mixture was reemulsified with a paddle stirrer at 1000 rpm for 3 hours to give a 50% dispersion.

COMPARATIVE EXAMPLE 3

0.11 g of boric acid was mixed with 99.89 g of the redispersible powder described in example 4. Crosslinking began even at the commencement of mixing. It was no longer possible to conduct a viscosity measurement.

COMPARATIVE EXAMPLE 4

The mixture described in example 4 of vinyl acetate copolymer and polyvinyl alcohol mixture was stirred up with water, without adding boric acid complex, to give a 50% dispersion.

FIG. 1 shows the viscosity curve of example 4 and comparative example 4.

EXAMPLE 5

20 g of polyvinyl alcohol having a Höppler viscosity of 5 mPas and a degree of hydrolysis of 86 mol % were dissolved in 80 ml of water, the solution was adjusted to a pH of 12, and 2 g of the Ca-boric acid-pentaerythritol complex from example 1 were added. After 30 minutes there was marked onset of crosslinking, with an increase in the viscosity from 600 mPas to 1800 mPas.

What is claimed is:

1. A crosslinkable polymer powder composition, comprising:
   a) at least one water soluble polyhydroxy compound;
   b) at least one salt of a boric acid complex having a water solubility less than 10 g/liter, said boric acid complex comprising a complex of boric acid with one or more bidentate or polydentate ligands; and
   c) a water insoluble, film-forming homopolymer or copolymer prepared by free radical initiated polymerization of one or more ethylenically unsaturated monomers.

2. The crosslinkable polymer powder composition of claim 1, wherein said homopolymer or copolymer c) contains repeating units derived from ethylenically unsaturated monomers selected from the group consisting of vinyl esters of branched $C_{1-15}$ alkylcarboxylic acids, vinyl esters of unbranched $C_{1-15}$ alkylcarboxylic acids, (meth)acrylic esters of branched $C_{1-12}$ alcohols, (meth)acrylic esters of unbranched $C_{1-12}$ alcohols, dienes, monolefins, vinylaromatics, and vinyl halides.

3. The crosslinkable polymer powder composition of claim 1, wherein said homopolymer or copolymer c) comprises at least one polymer selected from the group consisting of homopolymers containing repeating units derived from vinyl acetate, vinyl acetate-ethylene copolymers having vinyl acetate-derived moieties and from 1 to 60% by weight of ethylene-derived moieties; vinyl ester-ethylene-vinyl chloride copolymers having vinyl ester-derived moieties, 1–40 weight percent of ethylene-derived moieties and 20 to 90% vinyl chloride-derived moieties; vinyl ester copolymers containing 1–50 weight percent of vinyl ester-derived moieties and optionally 1–40 weight percent ethylene-derived moieties; vinyl ester-acrylic ester copolymers containing 30–90 weight percent vinyl ester-derived moieties, 1 to 60-weight percent acrylic ester-derived moieties and optionally 1 to 40 weight percent ethylene-derived moieties; vinyl ester-acrylic ester copolymers containing 30 to 75 weight percent vinyl acetate-derived moieties, 1 to 30 weight percent of vinyl ester-derived moieties other than vinyl acetate, and optionally 1–40 weight percent ethylene-derived moieties; homopolymers containing n-butyl acrylate-derived moieties; homopolymers containing 2-ethylhexylacrylate-derived moieties; copolymers containing methyl methacrylate-derived moieties and n-butylacrylate-derived moieties; copolymers containing methyl methacrylate-derived moieties and 2-ethylhexyl acrylate; copolymers containing methyl methacrylate-derived moieties, n-butylacrylate-derived moieties, and 2-ethylhexylacrylate-derived moieties; copolymers containing ethylene-derived moieties and vinyl chloride-derived moieties; copolymers containing vinyl chloride-derived moieties and acrylate ester-derived moieties; copolymers containing butadiene-derived moieties and 10 to 70 weight percent of styrene-derived moieties; and copolymers of styrene and acrylic ester(s) having acrylic ester-derived moieties and 10 to 70 weight percent styrene-derived moieties, all weight percents based on the weight of the respective homopolymer or copolymer.

4. The crosslinkable polymer powder composition of claim 2, wherein said copolymer further comprises from 0.05 to 10.0 weight percent, based on the weight of the monomers used to prepare said copolymer, of moieties derived from the copolymerization of one or more auxiliary monomers selected from the group consisting of ethylenically unsaturated mono- and dicarboxylic acids, ethylenically unsaturated mono- and dicarboxylic acid amides, ethylenically unsaturated sulfonic acids, ethylenically unsaturated sulfonic acid salts, ethylenically unsaturated alkoxysilane-functional monomers, ethylenically unsaturated methylol-functional monomers, isobutoxy ethers of ethylenically unsaturated methylol-functional monomers, n-butoxy ethers of ethylenically unsaturated methylol-functional monomers, ethylenically unsaturated epoxy-functional monomers, ethylenically unsaturated isocyanate group-containing monomers, and poly(ethylenically unsaturated) monomers, or wherein said copolymer is a copolymer containing vinyl acetate-derived moieties, and one or more of said auxiliary monomers is present in an amount of from 0.05 to 10.0 weight percent.

5. The crosslinkable polymer powder composition of claim 3, wherein said copolymer further comprises from 0.05 to 10.0 weight percent, based on the weight of the monomers used to prepare said copolymer, of moieties derived from the copolymerization of one or more auxiliary monomers selected from the group consisting of ethylenically unsaturated mono- and dicarboxylic acids, ethylenically unsaturated mono- and dicarboxylic acid amides, ethylenically unsaturated sulfonic acids, ethylenically unsaturated sulfonic acid salts, ethylenically unsaturated alkoxysilane-functional monomers, ethylenically unsaturated methylol-functional monomers, isobutoxy ethers of ethyleneically unsaturated methylol-functional monomers, n-butoxy ethers of ethylenically unsaturated methylol-functional monomers, ethylenically unsaturated epoxy-functional monomers, ethylenically unsaturated isocyanate group-containing monomers, and poly(ethylenically unsaturated) monomers, or wherein said copolymer is a copolymer containing vinyl acetate-derived moieties, and one or more of said auxiliary monomers is present in an amount of 0.05 to 10.0 weight percent.

6. The crosslinkable polymer powder composition of claim 1, wherein said water soluble polyhydroxy compound a) is selected from the group consisting of partially hydrolyzed polyvinyl alcohols, water soluble polysaccharides, starches, dextrins, cyclodextrins, dextran, xylan, celluloses, derivatized celluloses, and mixtures thereof.

7. The crosslinkable polymer powder composition of claim 1, wherein said water soluble polyhydroxy compound a) comprises one or more partially hydrolyzed polyvinyl alcohols having a degree of hydrolysis from 75 to 99 mol percent and a Höppler viscosity measured in 4 weight percent aqueous solution at 20° C. in accordance with DIN 53015, of 1 to 60 mPas.

8. The crosslinkable polymer powder composition of claim 7, wherein said Hopper viscosity is from 4 to 35 mPas.

9. The crosslinkable polymer powder composition of claim 1, wherein component b) comprises salts of boric acid complexes with aliphatic, alicyclic or aromatic polyols having 2 to 12 carbon atoms and having from 2 to 8 OH groups.

10. The crosslinkable polymer powder composition of claim 1, wherein said salts of boric acid contain at least one metal ion of a metal selected from groups Ia, IIa, Ib, IIb, VIIb, and VIIIb of the Periodic Table of the Elements.

11. The crosslinkable polymer powder composition of claim 6 wherein the derivatized celluloses are selected from the group consisting of carboxymethyl-cellulose, methyl-cellulose, hydroxyethyl-cellulose, hydroxypropyl-cellulose, and mixtures thereof.

12. A textile or paper composition containing as at least one binder thereof, the crosslinkable polymer powder composition of claim 1.

13. An adhesive composition comprising the crosslinkable polymer powder composition of claim 1.

14. A coating composition comprising the crosslinkable polymer powder composition of claim 1.

15. A paint composition comprising the crosslinkable polymer powder composition of claim 1.

16. A hydraulically setting construction material comprising at least one hydraulically setting inorganic binder and a crosslinkable polymer powder composition comprising:
   a) at least one water soluble polyhydroxy compound;
   b) at least one salt of a boric acid complex having a water solubility less than 10 g/liter, said boric acid complex comprising a complex of boric acid with one or more bidentate or polydentate ligands; and
   c) optionally, a water insoluble, film-forming homopolymer or copolymer prepared by free radical initiated polymerization of one or more ethylenically unsaturated monomers.

17. The construction material of claim 16 selected from the group consisting of structural adhesives, plasters, renders, filling compounds, trowel applied flooring compounds, and jointing mortars.

18. The construction material of claim 16 wherein said inorganic binder comprises one or more inorganic binders selected from the group consisting of portland cement, aluminate cement, pozzolanic cement, slag cement, magnesia cement, phosphate cement, plaster, and water glass.

19. The construction material of claim 17 wherein component c) is present.

20. The construction material of claim 18 wherein component c) is present.

21. The composition of claim 1 which is a construction material, and further comprises at least one hydraulically setting inorganic binder.

22. The composition of claim 21, which is a hydraulically setting construction material selected from the group consisting of structural adhesives, plasters, renders, filling compounds, trowel applied flooring compounds, jointing mortars, and paints.

23. A process for adhesively bonding wood fibers, paper fibers, or textile fibers or mixtures thereof, comprising applying to said fibers a curable adhesive composition comprising an aqueous dispersion of:
   a) a partially hydrolyzed polyvinyl alcohol; and
   b) a salt of a boric acid complex of boric acid and one or more bidentate or polydentate ligands, and having a water solubility less than 10 g/liter, the weight ratio of b) to a) being 0.01 to 0.2:1,
and curing to bind the fibers.

* * * * *